May 12, 1953   W. G. BALDWIN   2,637,912
SPIRIT PLUMBING TOOL AND LEVEL
Filed March 5, 1951   2 Sheets-Sheet 1
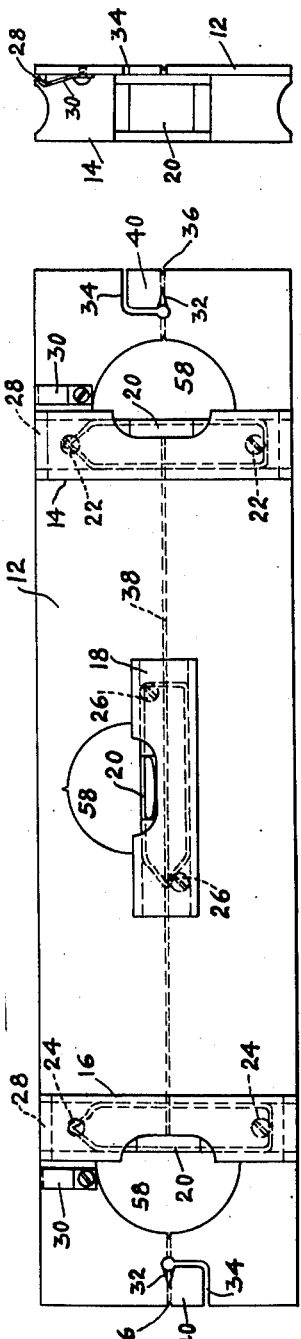
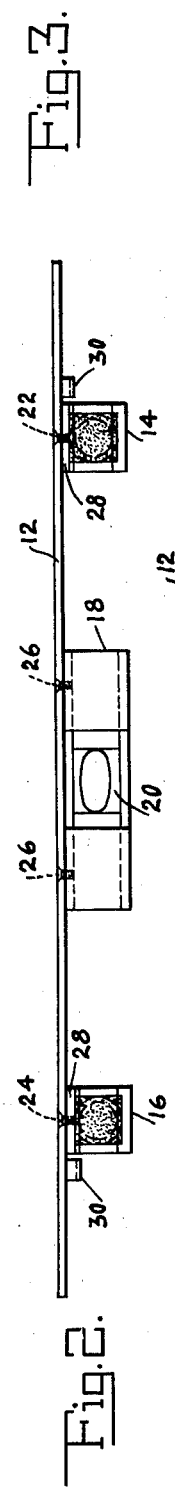
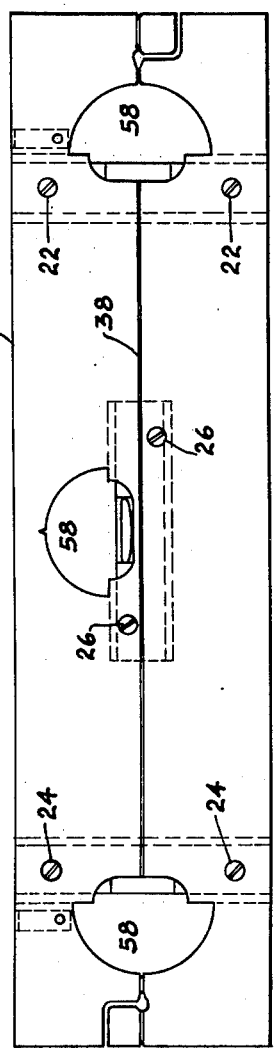
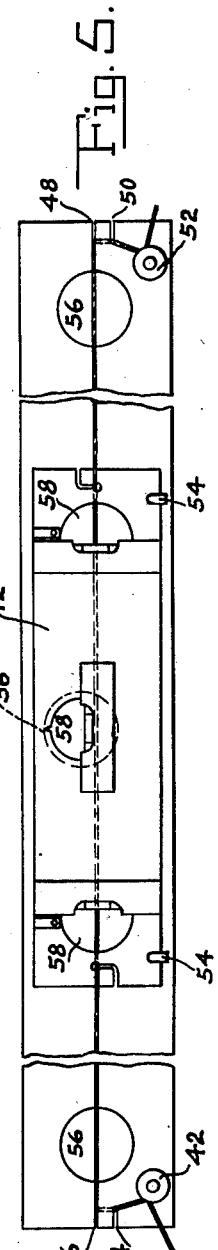
INVENTOR.
WILLIAM G. BALDWIN.
BY
Christy, Parmelee and Strickland
ATTORNEYS.

May 12, 1953 W. G. BALDWIN 2,637,912
SPIRIT PLUMBING TOOL AND LEVEL
Filed March 5, 1951 2 Sheets-Sheet 2
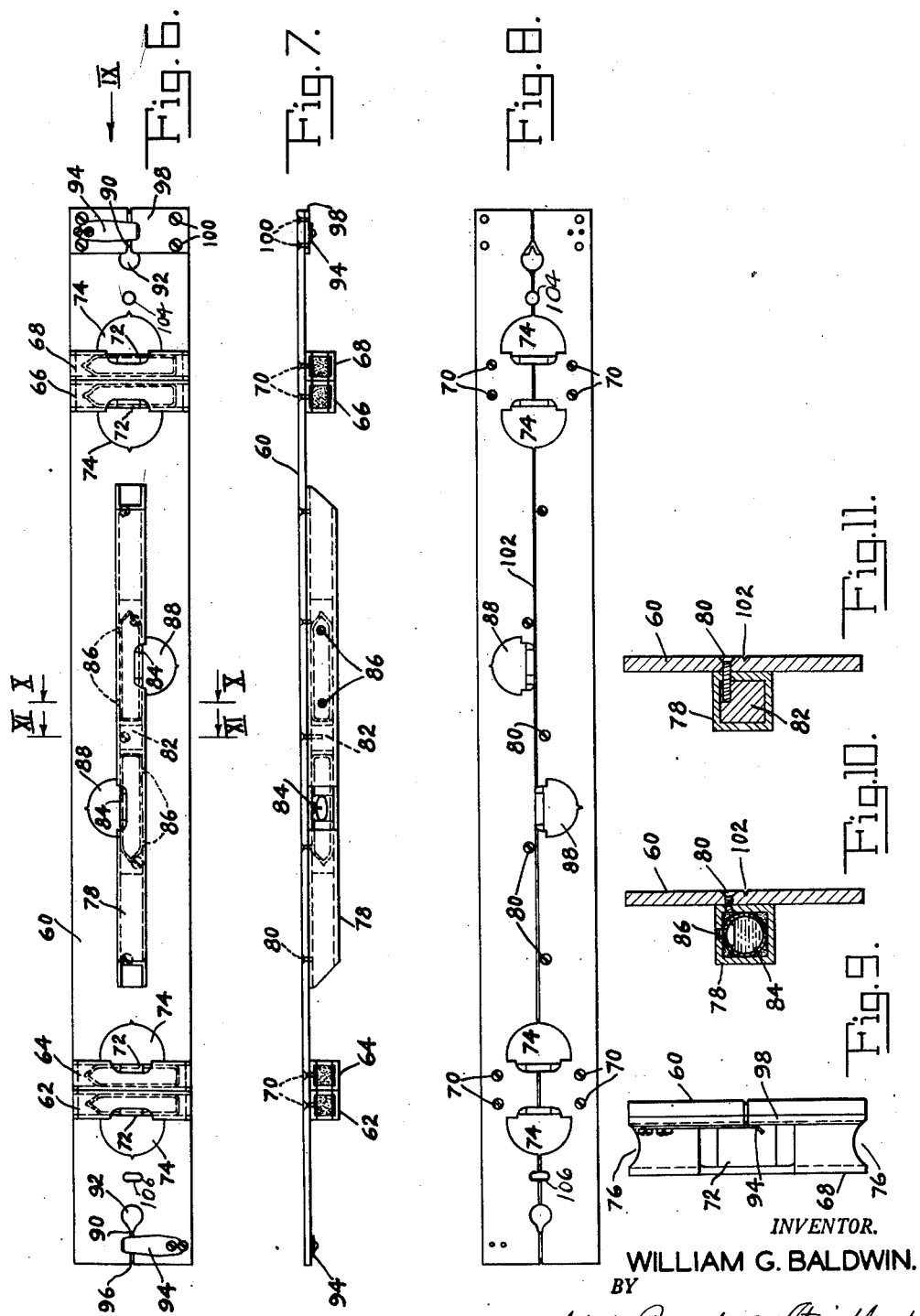
INVENTOR.
WILLIAM G. BALDWIN.
BY
Christy, Parmelee and Strickland
ATTORNEYS.

Patented May 12, 1953

2,637,912

UNITED STATES PATENT OFFICE 2,637,912

SPIRIT PLUMBING TOOL AND LEVEL

William G. Baldwin, Wilkinsburg, Pa.

Application March 5, 1951, Serial No. 213,951

15 Claims. (Cl. 33—207)

This invention relates to a spirit plumbing tool and level. More particularly, the invention relates to a light-weight bubble type level and to a bubble plumbing tool which may be used to replace a plumb bob.

The spirit level as an instrument for determining the slope of a surface with respect to a horizontal plane is of course a common expedient, and carpenter's levels are not infrequently provided with longitudinal and transverse bubble tubes so that vertical members, as for example door frames, may be set in a vertical position. However, the conventional carpenter's level is generally confined to use for these two purposes, and has little flexibility to adapt it to other uses. Usually such levels are made of wooden or metal frames having parallel sides and ends, and of thickness such that they may set edgewise on a flat surface, and will remain unsupported when so used. The bubble tubes are secured midway between the faces of the relatively thick frame in various ways. Such devices, because of the thickness of the frame or body of the level, have other undesirable qualities which restrict their utility.

For example, a carpenter or other craftsman or technician may use a conventional level for its usual purposes, but for projecting points in a vertical direction, must use a plumb bob. A plumb bob, to be accurate, must always be hung from an overhead support, so that points cannot be projected upwardly, as from a floor to the ceiling. Additionally, it must be freely suspended like a pendulum, to seek a vertical position. This is often annoying, particularly in a windy doorway for example. Finally, the measurement must always be at the elevation of the point of the plumb bob. That is to say, if the point of the plumb bob is at the floor, a position three feet, for example, above the floor cannot be easily located.

I have discovered that an appropriately constructed spirit level can have far greater utility and convenience than the present spirit level, or the present plumb bob. For example, a properly arranged spirit level may be used for plumbing, and points can be projected either upwardly or downwardly. Whereas the line of a plumb bob must hang free, a line on which a spirit level is placed may be held taut and moved about until the bubble is at the level position. Hence the craftsman moves the line to the vertical position instead of waiting for gravity to bring it there. This leads to an amazing increase in utility of a spirit level at no increase in cost, and renders it unnecessary for a technician to carry both a level and a plumb bob. Many limitations of both the plumb bob and spirit level are avoided, and a far more useful tool is provided.

My invention has for its object to provide a level of unique construction in which the bubble tubes are positioned on one side of the plane of a relatively thin straight-edged panel or plate, with the housings or casings for the bubble tubes so arranged, at least in part, as to give the tool a wide bearing surface when set edgewise on a plane surface.

A further object is to provide a tool which may be suspended from or threaded on a line, and used for plumbing, as well as for leveling.

A further object is to provide a tool that may be more convenient to use in restricted places or particular locations than conventional levels, or which may be secured to long straight edges such, for example, as are used by bricklayers and masons, and which is adaptable to a wide range of other uses.

The various features of the invention are illustrated in the accompanying drawings, in which:

Fig. 1 is a view in front elevation of one embodiment of the leveling and plumbing tool of the present invention;

Fig. 2 is a top plan view of the tool shown in Fig. 1;

Fig. 3 is an end view of the tool shown in Fig. 1;

Fig. 4 is a view in rear elevation of the tool shown in Fig. 1;

Fig. 5 is a view in front elevation of a straight edge with the leveling and plumbing tool shown in Fig. 1 mounted on the straight edge;

Fig. 6 is a view in front elevation of a leveling and plumbing tool embodying a preferred form of the invention;

Fig. 7 is a top plan view of the tool shown in Fig. 6;

Fig. 8 is a rear elevational view of the tool shown in Fig. 1;

Fig. 9 is an end elevation of the tool looking in the direction of the arrow IX of Fig. 6;

Fig. 10 is a sectional view of the tool taken on the line X—X of Fig. 6; and

Fig. 11 is a sectional view of the tool taken on the line XI—XI of Fig. 6.

Referring to Figs. 1 to 5, a simple form of the present invention consists of a leveling and plumbing tool made up of a thin backing plate 12 on which are mounted rectangular tubes 14 and 16 arranged transversely at right angles to the longitudinal axis of the plate 12. A rectangular tube 18 is mounted on the front face of the plate 12 in substantially the longitudinal center of the plate. In each of the tubes 14, 16 and 18 are mounted bubble tubes 20. The bubble of the tube 20 in the rectangular tube 18 is parallel to the longitudinal axis of the plate, while the bubbles in the tubes 20 mounted in the rectangular tubes 14 and 16 are in a plane at right angles to the longitudinal axis of the plate. The bubble tubes are held in adjusted position within the rectangular tubes 14, 16 and 18 with plaster of Paris.

The mounting of the rectangular tubes on the backing plate 12 constitutes an important feature of the present invention. Tubes 14 and 16 are held in position by screws 22 and 24 respectively (Fig. 4), with the ends of the tubes 14 and 16 flush with the edges of the plate 12. The rectangular tubes 14 and 16 have substantially the dimension shown in Figs. 1 and 2, and these tubes, together with the edge of the plate 12, form a footing upon which the level unit will stand in a vertical position, such as illustrated in Figs. 1 and 3. This construction is important in that the plate can be positioned on a surface so that level points on the plate may be easily transferred to the work to secure a location. The metal plate is preferably made of light metal, such as aluminum, magnesium, or alloys of aluminum and magnesium, so that the level unit itself is quite light. These alloys are strong and rigid so that they do not warp or go out of shape. Furthermore, the mounting of the tubes on the plate, particularly the mounting of the tube 18 by screws 26 (Fig. 4) reinforces the plate and prevents it from bending in a longitudinal or transverse direction.

As shown in Figs. 1 and 3, notches 28 are formed in the upper ends of the tubes 14 and 16 to receive a level line, and spring clips 30 are mounted on the plate 12 at each side of the tubes 14 and 16 to hold the line. The hooked ends of the clips 30 are carefully positioned so that when a level line is stretched under the hooks, the line will be parallel with the longitudinal axis of the plate. In this way the leveling unit may be moved along a comparatively long line for locating points in a horizontal leveling position.

Notches 32 are formed at each end in the longitudinal center of the plate 12 in position to receive a plumb line upon which the level unit may be suspended. A right angle slot 34 is formed in the ends of the plate 12 to form a communication by which the plumb line may be inserted into the notches 32. The notches 32 are made by elongating a hole in the plate 12 to bring the apex of the notch toward the end of the plate. In the ends of the plate, notches 36 are formed which may be seen from either side of the plate. On the back face of the plate 12 is formed a groove 38 arranged to receive the line for the purpose of enabling the level to be placed more nearly flat against and close to a unit upon a wall or a straight edge. When the line is introduced into the notches from the front face of the level unit and extends across the back face of the unit, the line will pass across bridge portions 40 formed by the right angle slots 34. With this construction the plumb line will be held in secure position in the level unit, and the level unit may be easily moved along the line due to the inclined arrangement of the notches 32.

In Fig. 5 is illustrated a straight edge which preferably is several times the length of the level unit and has the level unit mounted on a plumb line and attached to the straight edge. The plumb line extends from a line holder 42 through a notch 44 to a central notch 46 formed in the longitudinal axis of the straight edge. The line then passes along a front face of the straight edge and binds the front face of a level unit supported upon the straight edge and held in close engagement with the straight edge by the plumb line. Opposite the notch 46 is a notch 48 to receive another end of the plumb line which then passes through a notch 50 to a line holder 52. The true alignment of the level unit upon the straight edge is obtained by means of hooked pins 54 mounted in the face of the straight edge with their supporting face mounted in a plane parallel to the longitudinal axis of the straight edge. If desired, a series of pins may be mounted along the entire length of the straight edge so that the level unit may be moved from one end of the straight edge to the other. A series of openings 56 are formed in the straight edge in position to register with openings 58 in the level unit, whereby the level tubes in the level unit may be observed from either side of the straight edge.

As shown in Figs. 1 to 5, two transverse level tubes are mounted near the ends of the backing plate 12 for convenience in making plumbing determination when either edge of the plate 12 is placed on the object to be plumbed. One of the tubes 14 or 16 may be omitted if desired, because the bubble 20 in the tubes 14 or 16 may be observed from either side of the plate 12. This would be desirable, especially in a small or inexpensive tool.

In Figs. 6 to 11 inclusive of the drawings is illustrated the preferred form of spirit plumbing tool and level. This tool consists of a comparatively long thin backing plate 60 on which are mounted four rectangular tubes 62, 64, 66 and 68, these tubes being mounted transversely of the plate 60 with their faces arranged at right angles to the longitudinal axis of the plate 60. The tubes 62 to 68 inclusive are connected to the plate by means of screws 70 (Fig. 8) which rigidly hold the tubes in adjusted position. The tubes 62 to 68 inclusive are shown as square extrusion tubes made of aluminum, in which bubble tubes 72 are mounted with the plane of the bubble at right angles to the longitudinal axis of the plate. These tubes are set in plaster of Paris to hold them in fixed adjustment in the square tubes. Although two square tubes are shown as being used for holding the bubble tubes, it is apparent that one rectangular tube of sufficient size to hold two bubble tubes could be used in place of two square tubes. The tubes 62 to 68 have a cut-out portion in the center thereof to expose the bubbles of the tubes 72, the exposed surface being adjacent the front face of the plate. Openings 74 are formed in the plate 60 adjacent each of the bubble tubes 72 to permit the bubble tubes to be observed from either side of the plate. The tubes 62 to 68 rigidly reinforce the plate to keep it from going out of adjustment. As shown, these openings 74 are provided with center indicating notches which may be especially useful when the device is used for plumbing, or for carrying or projecting a reference point from one position to another.

The ends of the tubes 62 to 68 inclusive are flush with the edges of the straight edge plate 60 and project out from the face sufficiently far to form supporting surfaces by which the leveling and plumbing unit may stand in a vertical position such as illustrated in Figs. 6 to 9 inclusive. Preferably concave notches 76 are formed in the ends of the tubes 62 to 68 to provide supporting surfaces by which the leveling and plumbing unit may rest on cylindrical surfaces such as line shafts and pipes for the purpose of leveling or plumbing such objects.

From Figs. 6 and 7 it will be seen that a reinforcing tube 78 is secured to the front face of the plate 60 and extends from close proximity of the tube 64 to the tube 66. The tube 78 is connected to the plate 60 by a series of screws 80 (see Fig. 8) which are arranged in staggered relation with reference to the longitudinal axis of the plate in order to reinforce the plate and prevent it from going out of true straight edge alignment. A divisional block 82 (Figs. 6 and 11) is mounted in the center of the tube, and in each side of the block 82 is mounted a bubble tube 84. The adjustment of the bubble tubes 84 to bring the surface of the bubbles therein parallel to the longitudinal axis of the plate 60 is carried out by means of screws 86 (Figs. 7 and 10), and after the bubble tubes have been adjusted to proper position, they are fixed in position by means of plaster of Paris. Openings 88 are placed in the plate 60 in front of the bubble tubes 84 to permit the observation of the bubbles from either side of the plate 60. It will be understood that the top bubble tube 84 will be used as a leveling tube when the unit rests on the object to be leveled upon its lower edge (Fig. 6). If the unit is placed against the object to be leveled or plumbed on the upper edge (viewing Fig. 6) then the lower bubble tube 84 will be used for making leveling or plumbing determinations.

Notches 90 are formed in each end of the plate 60 in the longitudinal center of the plate. The notches 90 are opposite holes 92 which permit a plumb line to be passed through the hole to enter into the notches. Preferably the notches 90 are elongated at an acute angle to the longitudinal axis to permit the line to pass through the holes 92 and into the notches without engaging a sharp corner. When a plumb line is passed from the front face of the plate 60 through the holes 92 and extends back of the plate, it may be held in position by means of spring clips 94 which are mounted at the side of the notches 90. The spring clips are preferably adjusted to engage the plumb line with enough pressure so that the leveling and plumbing unit will move along the line easily but still will remain in any fixed position on the line. With this arrangement the leveling unit may be suspended from a plumb line and used for plumbing purposes in the same way that a plumb bob is used. Furthermore a pin may be mounted in a shallow notch 96 formed at each end of the plate 60, which is an extension of the notch 90 located parallel to the longitudinal axis of the plate. When a pin is in the notch 96, this pin may be located over a point and used in identically the same way that a plumb bob is used. The point will be located at the time that the bubbles in the tubes 62 to 68 which are in upright position, show that the plate 60 is hanging in a true vertical position. A continuation of the notches 96 is formed in the ends of the plate 60 whereby reference points may be made on the work when the leveling unit is suspended in vertical position. Due to the mounting of the square tubes on the plate 60, it is necessary to balance the leveling unit so that it will hang in a vertical position. To accomplish this a plate 98 is secured to the plate 60 by screws 100, and the groove 96 is formed in this plate to receive the plumb line. With this balancing member on the plate, the leveling unit will hang in a true vertical position when suspended from either end of the plate 60. A groove 102 (Fig. 3) is formed on the back face of the plate to receive the plumb line so that a leveling unit may be attached to a straight edge similarly to that illustrated in Fig. 5 for the purpose of precision leveling when a comparatively long straight edge is required.

A hole 104 is placed near one end of the plate 60 and a slot 106 is placed near the other end of the plate 60, by which the plumbing and leveling tool may be attached to the face of a long straight edge and adjusted to bring the longitudinal axis of the tool parallel with the edges of the straight edge.

The preferred form of the invention having thus been described, what is claimed as new is:

1. A spirit leveling and plumbing tool comprising an elongated thin flat backing plate, a rectangular tube having a bubble tube mounted therein attached transversely of the front side of the backing plate and near the end of the plate with the ends of the rectangular tube being flush with the edges of the backing plate and positioned at right angles to the longitudinal axis of the backing plate, a rectangular tube having a bubble tube therein with a flat face mounted on the front side of the backing plate at substantially the center of its longitudinal axis with the surface of the bubble in the bubble tube parallel to the longitudinal axis of the plate, said longitudinal rectangular tube being secured to the thin plate to reinforce the plate against sagging, said rectangular tubes being cut away at the central portion thereof to expose graduations on the bubble tubes, and openings in the backing plate adjacent the cut-out portion of the rectangular tubes to permit the bubble tubes to be observed from the back side of the backing plate.

2. The level defined in claim 1 in which the side dimensions of the rectangular tube are large enough so that the ends of the tubes and the edges of the plate will provide a supporting surface for the level to stand firmly on a plane surface with the plate in vertical position.

3. The level defined in claim 1 in which each end of the backing plate has a notch extending through the plate at the longitudinal center thereof and a line is mounted in the notches by which the level may be suspended to use a transverse bubble tube for plumbing.

4. The level defined in claim 3 in which clips are secured to the front face of the plate in position to clamp a plumb line which passes through the notches against the plate to suspend the level from the plumb line that is supported parallel to the central longitudinal axis of the plate.

5. The level defined in claim 3 in which the notches in the ends of the plate are formed by elongating a hole so that a side of the holes in the plate are arranged at an acute angle to the longitudinal axis of the plate.

6. The level defined in claim 1 in which the transverse rectangular tube is made of two rectangular tubes with bubble openings in opposite sides of the rectangular tubes in front of the backing plate and observation openings are positioned in the plate at the side bubble tube openings.

7. The leveling and plumbing tool defined in claim 1 in which a transversely mounted rectangular tube having bubble tube therein is mounted near each end of the backing plate.

8. The leveling and plumbing tool defined in claim 7 in which the ends of the rectangular tubes mounted transversely of the backing plate have concave depressions therein to provide surfaces for positioning the tool on cylindered body to be plumbed or leveled.

9. The level defined in claim 7 in which a notch extends through each end of the plate at the longitudinal center thereof and a balancing strip is attached tranversely of the plate at one end thereof with a notch formed in the strip at the longitudinal center of the plate, and means to lock a plumb line in the transverse plate notch to hang the level to make a plumbing determination when using the transverse bubble tubes.

10. The level defined in claim 7 in which is the longitudinal rectangular reinforcing tube attached to the central portion of the front side of the backing plate extends from a point close to one transverse rectangular tube to a point close to the other transverse rectangular tube.

11. The level defined in claim 8 in which the reinforcing tube contains two bubble tubes which are located adjacent the longitudinal center of the plate with bubble tube cut-out portions on the upper and lower sides of the tube in front of the plate, and openings in the plate by which the bubble tubes may be observed from the back side of the plate.

12. The level defined in claim 11 in which adjusting screws are mounted at each end of the bubble tubes in the reenforcing tube for the purpose of adjusting the surface of the bubbles in the tubes to a position parallel to the longitudinal axis of the plate.

13. The level defined in claim 1 together with a straight edge plate which is wider than the backing plate, and several times as long as the backing plate, wherein notches are formed in the ends of the straight edge plate adjacent the center of the ends in a line parallel to an edge of the plate, notches formed in the ends of the backing plate at the longitudinal center thereof a line mounted in the notches at the ends of the backing and straight edge plates extending the entire length of the plates to draw the plates together, spacing pins in the straight edge plate to position one edge of the backing plate so that the central longitudinal axis of the backing plate is over the central longitudinal axis of the straight edge plate, and clamps at the ends of the straight edge plate to fasten the ends of the line to hold the plates together.

14. The level defined in claim 13 in which grooves are formed in the back side of the backing plate so that the plates will have a close surface contact when the line is received in the groove in the backing plate.

15. The level defined in claim 13 in which the line passes through the notches in the backing plate extends across a bridge at each end of the backing plate to hold the two plates in secure position.

WILLIAM G. BALDWIN.

References Cited in the file of this patent

UNITED STATES PATENTS

| Number | Name | Date |
| --- | --- | --- |
| 26,956 | Steger | Jan. 24, 1860 |
| 370,054 | Fox | Sept. 20, 1887 |
| 463,771 | Standifier | Nov. 24, 1891 |
| 505,937 | Brown | Oct. 3, 1893 |
| 585,850 | Patrick | July 6, 1897 |
| 618,254 | Morrison | Jan. 24, 1899 |
| 812,449 | Potter | Feb. 13, 1906 |
| 926,661 | Leiby | June 29, 1909 |
| 1,777,429 | Charlton | Oct. 7, 1930 |
| 2,383,527 | Whitechester | Aug. 28, 1945 |